US011879812B2

(12) United States Patent
Kyriacou

(10) Patent No.: US 11,879,812 B2
(45) Date of Patent: Jan. 23, 2024

(54) REFRIGERATOR APPLIANCE WATER FILTER WITH EMBEDDED LEAK SENSOR

(71) Applicant: Haier US Appliance Solutions, Inc., Wilmington, DE (US)

(72) Inventor: Stephanos Kyriacou, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 410 days.

(21) Appl. No.: 17/115,192

(22) Filed: Dec. 8, 2020

(65) Prior Publication Data

US 2022/0178784 A1 Jun. 9, 2022

(51) Int. Cl.
*G01M 3/26* (2006.01)
*F25D 29/00* (2006.01)
*B01D 35/143* (2006.01)

(52) U.S. Cl.
CPC ............. *G01M 3/26* (2013.01); *B01D 35/143* (2013.01); *F25D 29/008* (2013.01); *F25D 2323/121* (2013.01)

(58) Field of Classification Search
CPC ............. F25D 29/008; F25D 2323/121; F25D 23/126; G01M 3/26; G01M 3/322
See application file for complete search history.

(56) References Cited

U.S. PATENT DOCUMENTS

| 9,857,803 | B1 | 1/2018 | Abuda et al. |
| 10,286,343 | B2 | 5/2019 | Paluszewski et al. |
| 2004/0079148 | A1* | 4/2004 | Sandford ............. B01D 29/608 73/756 |
| 2006/0027267 | A1* | 2/2006 | Fritze ........................ F17D 5/02 62/189 |
| 2019/0160462 | A1 | 5/2019 | Shmilovich et al. |
| 2020/0306672 | A1* | 10/2020 | Subrahmanya ....... G01M 3/007 |

FOREIGN PATENT DOCUMENTS

| CN | 206512009 U | 9/2017 |
| CN | 110101310 A | 8/2019 |

* cited by examiner

*Primary Examiner* — Kun Kai Ma
(74) *Attorney, Agent, or Firm* — Dority & Manning, P.A.

(57) ABSTRACT

A water filter for a refrigerator appliance with a sensor embedded in the water filter and related methods of detecting a leak in the refrigerator appliance are provided. Such methods include, and the refrigerator appliance may be configured for, measuring, by the sensor embedded in the water filter, at least one of water pressure in the water filter and flow through the water filter. A rate of change of the at least one of water pressure in the water filter and flow through the water filter over time is calculated. When there is no system demand for water, a leak is detected based on the increase in the rate of change over time.

16 Claims, 6 Drawing Sheets

REFRIGERATOR APPLIANCE WATER FILTER WITH EMBEDDED LEAK SENSOR

FIELD OF THE INVENTION

The present subject matter relates generally to refrigerator appliances, and more particularly to systems and methods for detecting leaks in a refrigerator appliance.

BACKGROUND OF THE INVENTION

Refrigerator appliances generally include a cabinet that defines a chilled chamber. A wide variety of food items may be stored within the chilled chamber. The low temperature of the chilled chamber relative to ambient atmosphere assists with increasing a shelf life of the food items stored within the chilled chamber.

In addition, refrigerator appliances commonly include dispensing assemblies for providing water and/or ice to the user, and water filter assemblies are frequently used to filter such water before use. For example, certain water filter assemblies include a filter cartridge having a housing and a filter medium therein. Unfiltered water flows into the housing of the filter cartridge and filtered water flows out of the housing of the filter cartridge. The filter medium may be an activated carbon block, a pleated polymer sheet, a spun cord material, or a melt blown material. The filter medium is positioned within the housing and filters water passing therethrough.

Water leaks can form or develop at one or more various locations in or around the water filter assembly, such as where the filter cartridge mounts to a manifold. As an example, such leaks can develop if the water filter assembly is installed incorrectly or is exposed to relatively high water pressures or freezing conditions. Such leaks can negatively affect operation of the water filter assembly and/or the refrigerator appliance and can cause damage if not prevented. Such leaks can also be difficult to detect. In particular, water filter assemblies are often positioned in relatively remote locations within refrigerator appliances such that visually monitoring the water filter assemblies for leaks can be difficult or infrequent. As another example, existing leak detection systems and methods typically rely on direct detection of the leak, e.g., the leaked water must come into direct physical contact with a sensor in order for the sensor to detect the leak. Thus, leaks at locations remote from the sensor may be delayed in detection or not detected at all.

Accordingly, a refrigerator appliance with an improved filter assembly would be useful. More specifically, a filter that can be used to detect water leaks would be particularly beneficial.

BRIEF DESCRIPTION OF THE INVENTION

Aspects and advantages of the invention will be set forth in part in the following description, or may be apparent from the description, or may be learned through practice of the invention.

In an exemplary embodiment, a method of detecting a leak in a refrigerator appliance is provided. The refrigerator appliance includes a cabinet, a food storage chamber defined in the cabinet, a water supply line, a water filter coupled to the water supply line, and a sensor embedded in the water filter. The method includes measuring, by the sensor embedded in the water filter, water pressure in the water filter and measuring, by the sensor embedded in the water filter, flow through the water filter. The method further includes receiving, by a controller of the refrigerator appliance, the pressure measurements and the flow measurements from the sensor. The method also includes detecting a leak based on the received pressure measurements and flow measurements In another exemplary embodiment, a refrigerator appliance is provided. The refrigerator appliance includes a cabinet with a food storage chamber defined in the cabinet. The refrigerator appliance also includes a water supply line with a water filter coupled to the water supply line. A sensor is embedded in the water filter. The sensor is configured to measure water pressure in the water filter and flow through the water filter. The refrigerator appliance also includes a controller in operative communication with the sensor. The controller is configured to receive pressure measurements and flow measurements from the sensor and to detect a leak based on the received pressure measurements and flow measurements.

In an additional exemplary embodiment, a method of detecting a leak in a refrigerator appliance is provided. The refrigerator appliance includes a cabinet, a food storage chamber defined in the cabinet, a water supply line, a water filter coupled to the water supply line, and a sensor embedded in the water filter. The method includes measuring, by the sensor embedded in the water filter, at least one of water pressure in the water filter and flow through the water filter. The method also includes calculating a rate of change of the at least one of water pressure in the water filter and flow through the water filter over time. In response to an increase in the rate of change of the at least one of water pressure in the water filter and flow through the water filter over time, the method includes determining whether there is a system demand for water. When there is no system demand for water, the method detects a leak based on the increase in the rate of change over time.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
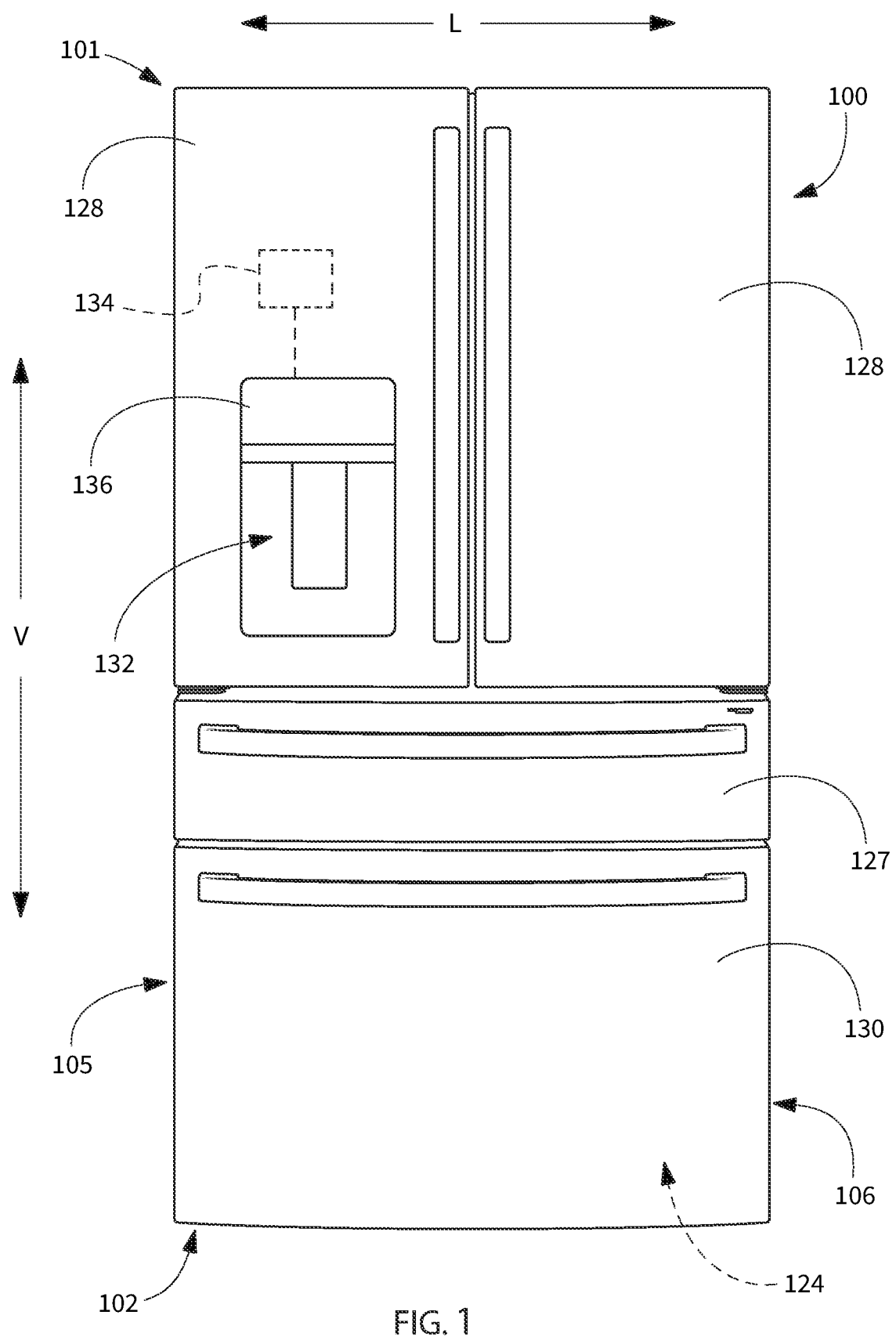
FIG. 1 provides a front view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
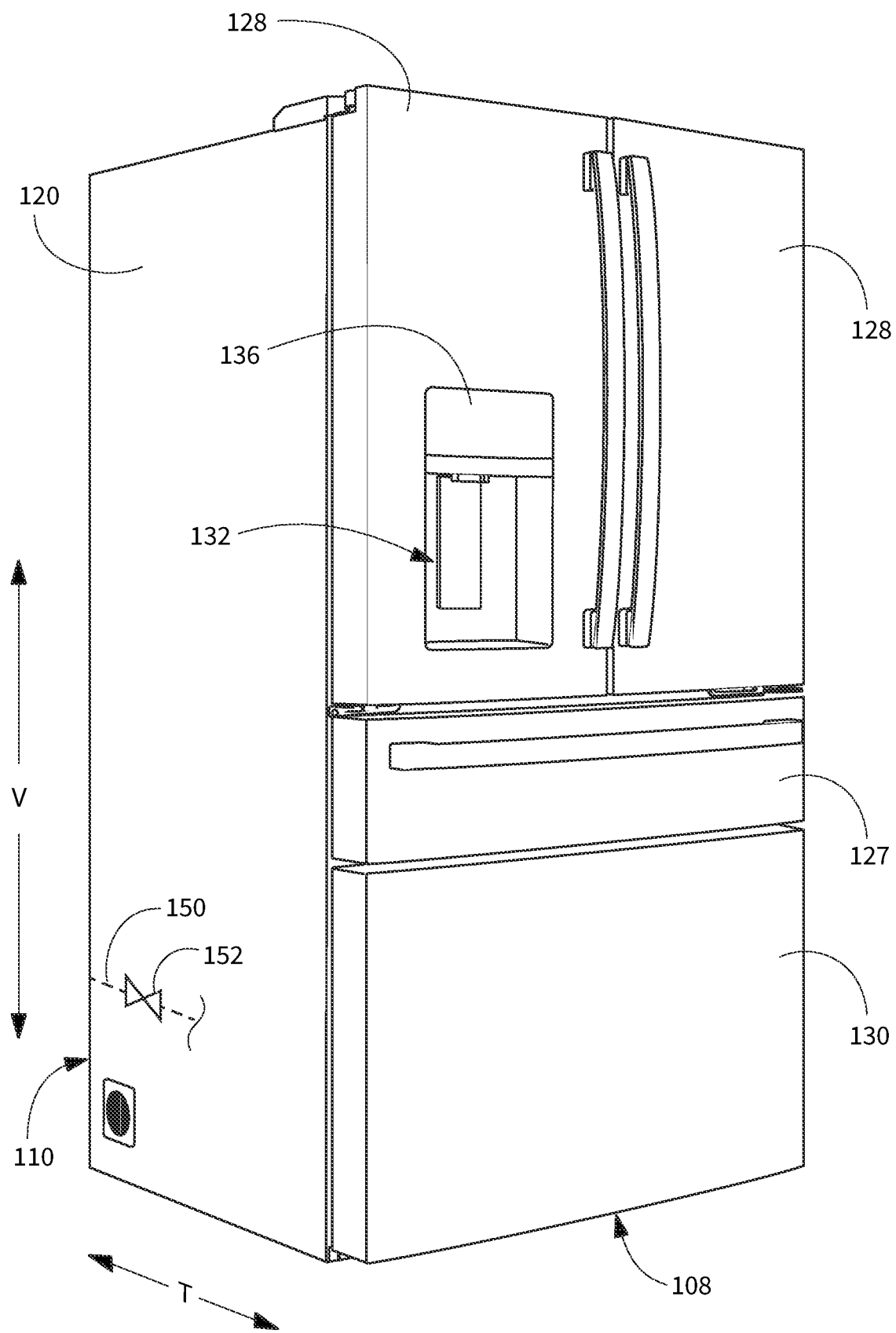
FIG. 2 provides a perspective view of the refrigerator appliance of FIG. 1.
Figure 3:
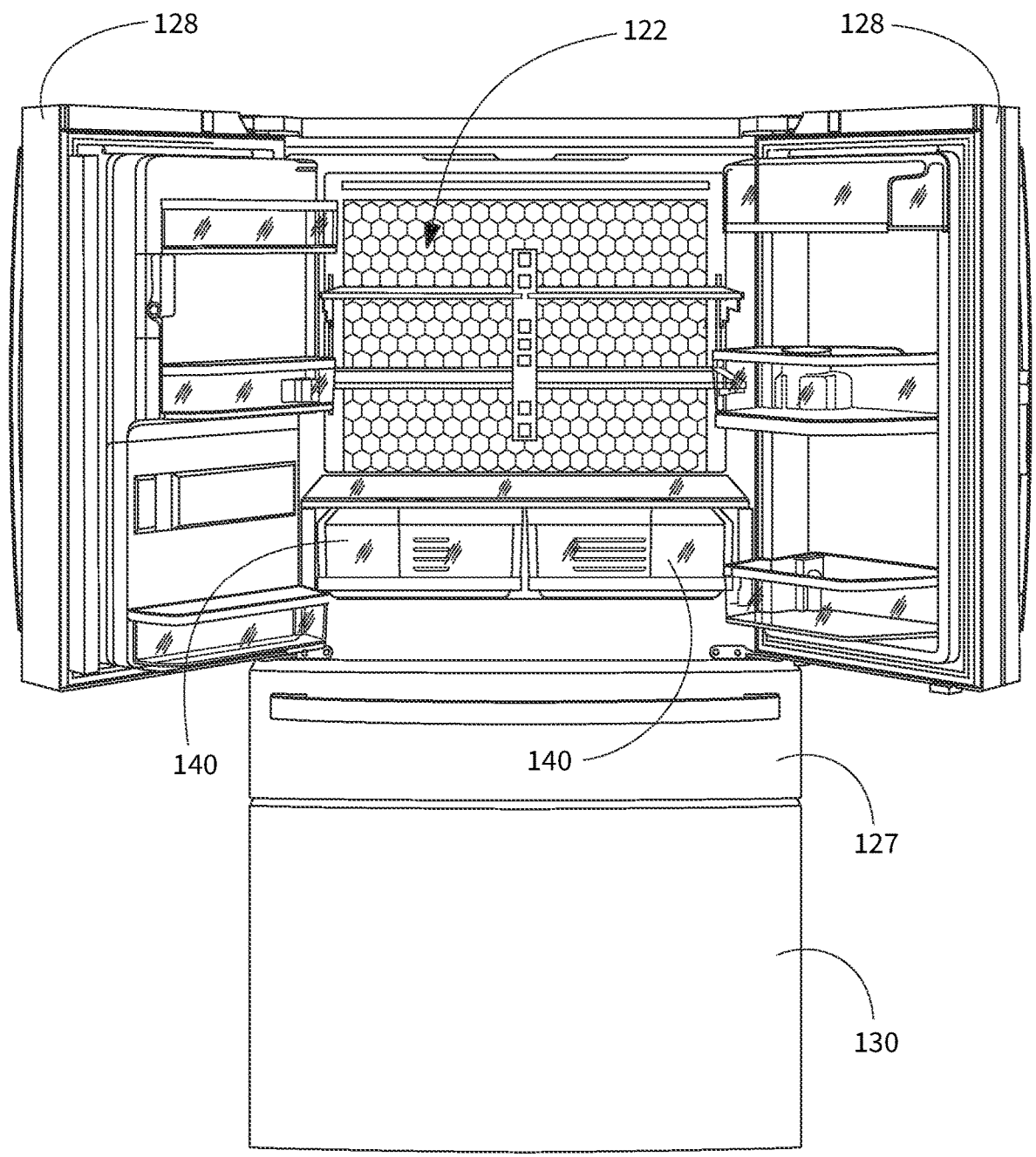
FIG. 3 provides a front view of the refrigerator appliance of FIG. 1 with doors in an open position.

FIG. 1 is a front view of an exemplary embodiment of a refrigerator appliance 100. FIG. 2 is a perspective view of the refrigerator appliance 100. FIG. 3 is a front view of the refrigerator appliance 100 with fresh food doors 128 thereof in an open position. Refrigerator appliance 100 extends between a top 101 and a bottom 102 along a vertical direction V. Refrigerator appliance 100 also extends between a first side 105 and a second side 106 along a lateral direction L. As shown in FIG. 2, a transverse direction T may additionally be defined perpendicular to the vertical and lateral directions V, L. Refrigerator appliance 100 extends along the transverse direction T between a front portion 108 and a back portion 110.

Refrigerator appliance 100 includes a cabinet or housing 120 defining an upper fresh food chamber 122 (FIG. 3) and a lower freezer chamber or frozen food storage chamber 124 (FIG. 1) arranged below the fresh food chamber 122 along the vertical direction V. Because the freezer chamber 124 is positioned below the fresh food chamber 122, refrigerator appliance 100 is generally referred to as a bottom mount refrigerator. In an exemplary embodiment, housing 120 also defines a mechanical compartment (not shown) for receipt of a sealed cooling system (not shown). Using the teachings disclosed herein, one of skill in the art will understand that the present technology can be used with other types of refrigerators (e.g., side-by-sides) or a freezer appliance as well. Consequently, the description set forth herein is for illustrative purposes only and is not intended to limit the technology in any aspect.

Refrigerator doors 128 are each rotatably hinged to an edge of housing 120 for accessing fresh food chamber 122. It should be noted that while two doors 128 in a "French door" configuration are illustrated, any suitable arrangement of doors utilizing one, two or more doors is within the scope and spirit of the present disclosure. A freezer door 130 is arranged below refrigerator doors 128 for accessing freezer chamber 124. In the exemplary embodiment, freezer door 130 is coupled to a freezer drawer (not shown) slidably mounted within freezer chamber 124. An auxiliary door 127 is also provided, and the auxiliary door 127 may be slidably mounted within an auxiliary chamber (not shown) which is positioned between the fresh food storage chamber 122 and the freezer chamber 124. As may be seen in FIG. 3, a plurality of food storage drawers 140 may be disposed within the fresh food storage chamber 122. Although not specifically labelled, additional example food storage components such as bins and shelves may also be seen in FIG. 3.

As illustrated in FIG. 2, in some embodiments, the refrigerator appliance 100 may include a water supply line 150. The water supply line 150 may be configured to couple the refrigerator appliance 100 to a water supply such as a plumbing system, whereby the water supply line 150 receives water from the water supply and delivers water to various other components of the refrigerator appliance 100, such as an ice maker and/or a water dispenser. The refrigerator appliance 100 may also include a main valve 152 which permits flow of water through the water supply line 150 when the main valve 152 is in an open position and which prevents or obstructs the flow of water through the water supply line 150 when the main valve 152 is in a closed position.

Operation of the refrigerator appliance 100 can be regulated by a controller 134 (FIG. 1) that is operatively coupled to a user interface panel 136. Interface panel 136 provides selections for user manipulation of the operation of refrigerator appliance 100 to modify environmental conditions therein, such as temperature selections, etc. In some embodiments, user interface panel 136 may be proximate a dispenser assembly 132. In response to user manipulation of the user interface panel 136, the controller 134 operates various components of the refrigerator appliance 100. Operation of the refrigerator appliance 100 can be regulated by the controller 134, e.g., controller 134 may regulate operation of various components of the refrigerator appliance 100 in response to programming and/or user manipulation of the user interface panel 136.

The controller 134 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. It should be noted that controllers 134 as disclosed herein are capable of and may be operable to perform any methods and associated method steps as disclosed herein.

The controller 134 may be positioned in a variety of locations throughout refrigerator appliance 100. In the illustrated embodiment, the controller 134 may be located within the door 128. In such an embodiment, input/output ("I/O") signals may be routed between the controller and various operational components of refrigerator appliance 100. In one embodiment, the user interface panel 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. For example, the user interface 136 may include a touchscreen providing both input and display functionality. The user interface 136 may be in communication with the controller via one or more signal lines or shared communication busses.

Figure 4:
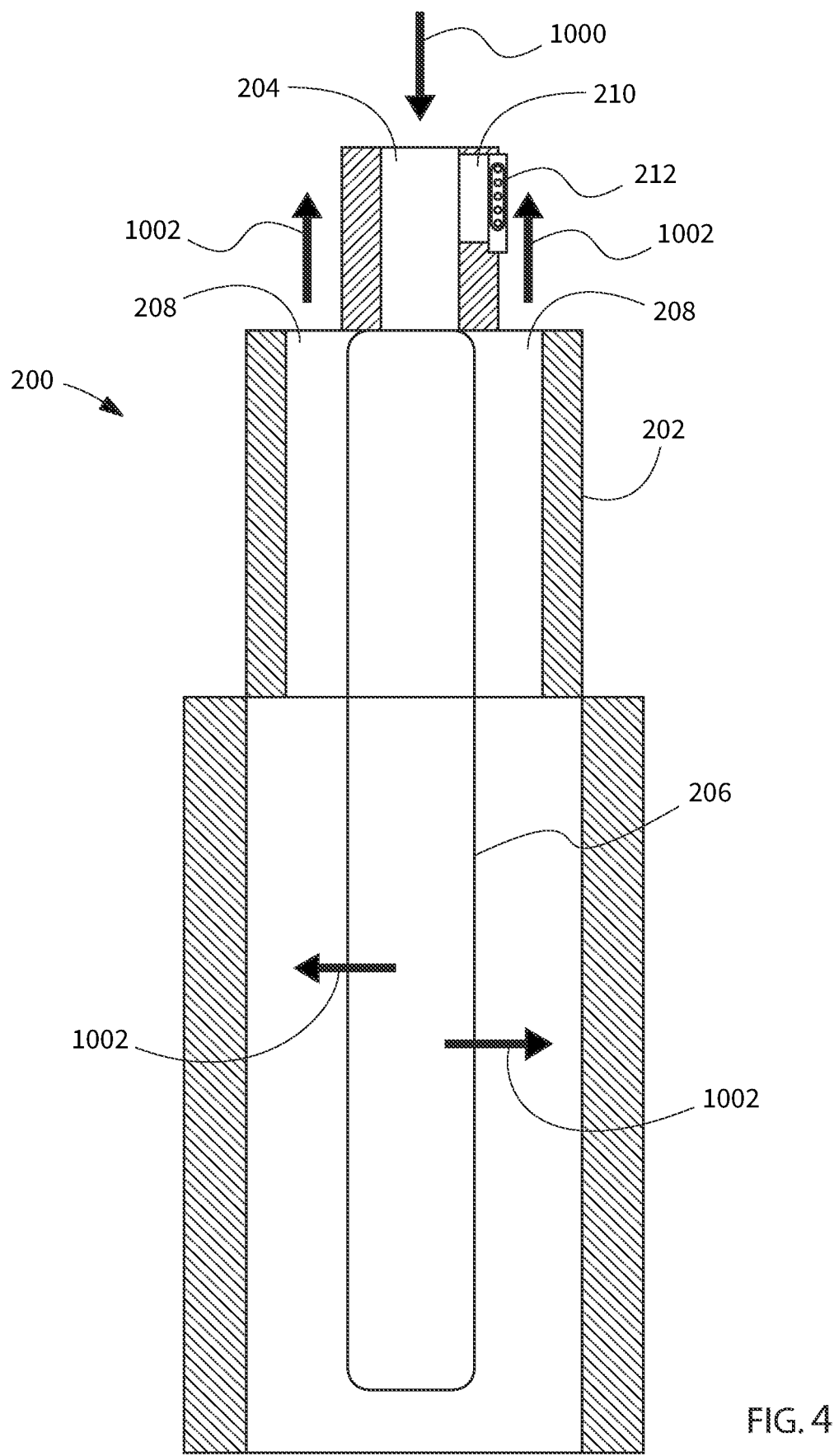
FIG. 4 provides a simplified section view of a water filter with an embedded sensor according to one or more embodiments of the present disclosure which may be incorporated into a refrigerator appliance such as the exemplary refrigerator appliance of FIG. 1.

Using the teachings disclosed herein, one of skill in the art will understand that the present subject matter can be used with other types of refrigerators such as a refrigerator/freezer combination, side-by-side, bottom mount, compact, and any other style or model of refrigerator appliance. Accordingly, other configurations of refrigerator appliance 100 could be provided, it being understood that the configurations shown in the accompanying FIGS. and the description set forth herein are by way of example for illustrative purposes only.

In some embodiments, e.g., as illustrated in FIG. 4, the refrigerator appliance 100 may include a water filter 200 connected thereto. For example, the water filter 200 may be coupled to the water supply line 150 (FIG. 2) such that the water filter 200 receives a flow of water 1000, e.g., which may be referred to as raw or unfiltered water, from the water supply line 150 and provides a flow of water 1002, e.g., filtered water, to a portion of the water supply line 150 downstream of the filter 200 and/or various fixtures or components of the refrigerator appliance 100 such as an ice maker or water dispenser, etc. The water filter 200 may include a housing 202 which defines an internal volume with an inlet 204 opening through the housing 202 into the internal volume and an outlet 208 from the internal volume. As illustrated in FIG. 4, unfiltered water 1000 may flow into the filter 200 via the inlet 204. The water may then pass through a filter medium 206, e.g., a membrane, activated carbon, or other suitable filter medium including combinations of more than one media, thereby producing filtered water 1002 which exits the water filter 200 via the outlet 208.

A sensor 210 may be embedded in the water filter 200. In particular, the sensor 210 may be embedded in the housing 202 of the water filter 200. For example, in some embodiments, the sensor 210 may be embedded within the housing 202 such that the sensor 210 is surrounded on at least four sides by the material of the housing 202. In some embodiments, the sensor 210 may be embedded within the housing 202 such that the sensor 210 is surrounded on five sides by the material of the housing 202 and exposed on only one side of the sensor 210. The only one exposed side of the sensor 210 may be exposed to an interior of the filter 200 such that the only one exposed side of the sensor 210 is exposed to a portion of an intended water flow path through the refrigerator appliance 100 and the sensor 210 is thereby partially wetted by water flowing along the intended water flow path. For example, in the embodiment illustrated in FIG. 4, the sensor 210 is exposed on one side to water flowing through the inlet 204 of the filter 200, where the inlet 204 is a portion of the intended water flow path. The intended water flow may be at least partially defined by the water supply line 150 and the water filter 200, such as defined by the water supply line 150 and various fittings, fixtures, and/or components coupled thereto, e.g., the water filter 200, valve 152, an ice maker, a water dispenser, etc. Also, the intended water flow path and water therein is to be understood as distinct from possible leak paths and leaked water, e.g., leaked water may include water which escapes from and is outside of the intended water flow path. The leaked water may escape at any point along the intended water flow path, upstream or downstream of the sensor 210, and, as described in more detail below, may be detected by the sensor 210 regardless of which point or points along the intended water flow path the leaked water escapes from. In other embodiments, the sensor 210 may be exposed on two sides, including the one side that is exposed to the intended flow path as described in the foregoing and a second side which is partially exposed in order to permit a physical connection between the sensor 210 and the controller 134, such as via pins 212 as described below.

In some embodiments, the sensor 210 may be configured to communicate wirelessly with the controller 136, e.g., the sensor 210 may be connected to the controller 134 wirelessly, such as by a BLUETOOTH® connection. In other embodiments, one or more power pins 212 or other suitable wired connection points may be provided in communication with the sensor 210 whereby the sensor 210 may be in operative communication with the controller 134 via a wired connection. In such embodiments, the sensor 210 may be embedded within the housing 202 except for the wired connection point, e.g., power pins 212, where the wired connection point of the sensor 210 is exposed from and/or extends through or outside of the housing 202.

Figure 5:
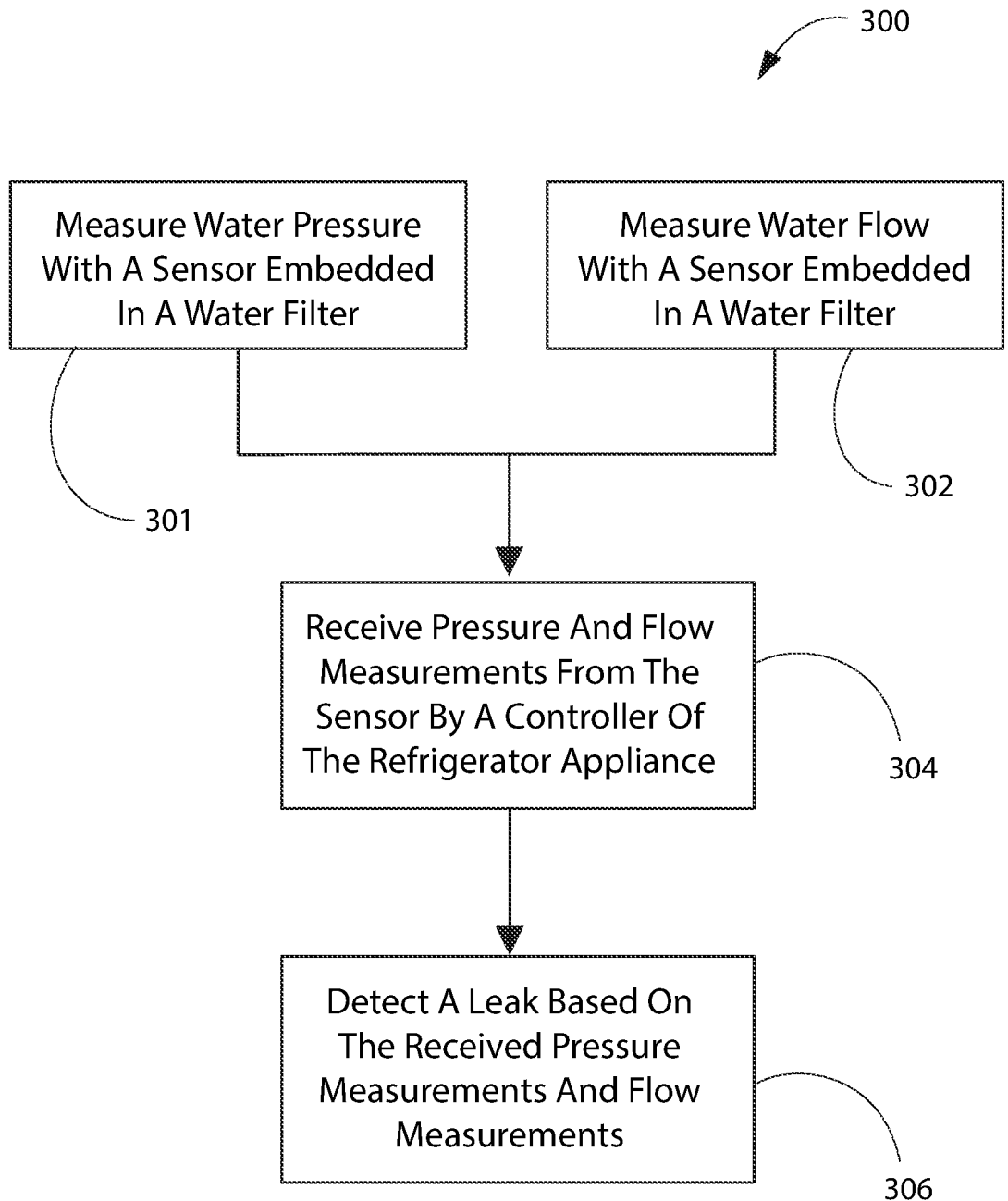
FIG. 5 provides a flow chart of an example method of detecting a leak in a refrigerator appliance according to one or more embodiments of the present subject matter.

In some embodiments, the sensor 210 may be a microelectromechanical system (MEMS) sensor. The sensor 210 may be any suitable sensor which can be small enough to embed within the housing 202 while also measuring and/or monitoring (e.g., repeatedly or continuously measuring over time) the water pressure in the filter and/or the rate of flow through the filter. By measuring the pressure and/or flow, the sensor 210 may detect a leak without directly detecting the leak, e.g., without direct, physical contact between the sensor 210 and the leaked water. Thus, the sensor 210 may detect a leak at any location in the water system (upstream or downstream of the sensor 210) with a single sensor, e.g., as opposed to requiring multiple sensors at multiple locations in order to detect most or all possible leaks. In the illustrated example embodiment, the sensor 210 is embedded in the housing 202 at the inlet 204, such that the sensor 210 measures inlet pressure and flow through the inlet. In additional embodiments, the sensor 210 may be embedded in any other portion of the housing 202 to measure the local pressure at such other portion of the housing 202. In at least some embodiments, the leak detection described herein is based on a change in pressure over time, regardless of the location at which the pressure is measured or the absolute pressure. The sensor 210 may detect a leak based on a change over time, such as an increase in a flow rate over time and/or a decrease in pressure, that is measured by the sensor 210. For example, the sensor 210 may be in operative communication with the controller 134, as described above, such that the sensor 210 and the controller 134 detect the leak, such as by measuring the pressure and/or flow with the sensor 210 and calculating the rate of change of the pressure and/or flow with the controller 134. The leak may then be detected, for example, based on an increase in the rate of change of the pressure, e.g., the pressure dropping more quickly, and/or an increase in the rate of change of the flow, e.g., the flow increasing more quickly Turning now to FIG. 5, embodiments of the present disclosure may include a method 300 of detecting a leak in a refrigerator appliance, such as the exemplary refrigerator appliance 100 described above. For example, the refrigerator appliance may include a controller and a water filter with an embedded sensor, as described above. As illustrated in FIG. 5, in some embodiments, the method 300 may include a step 301 of measuring water pressure in the water filter with a sensor embedded in the water filter and a step 302 of measuring flow through the water filter with the sensor embedded in the water filter. The measurements may then be transmitted to and received by a controller of the refrigerator appliance. For example, as illustrated in FIG. 5, the method 300 may further include a step 304 of receiving the pressure measurements and the flow measurements from the sensor, and the step of receiving may be performed by a controller of the refrigerator appliance. In some embodiments, e.g., as illustrated at step 306 in FIG. 5, the method 300 may then include detecting a leak based on the received pressure measurements and flow measurements. For example, the leak may be detected in response to and because of the received pressure measurements and flow measurements, e.g., as a result of an identified change in the pressure measurements and flow measurements. Additionally, the leak may be detected regardless of whether the leak reaches the sensor or the portion of the filter in which the sensor is embedded. For example, the leak may be detected without requiring the leaked water to contact the sensor before detecting the leak.

As mentioned, the leak may be detected based on changes in the pressure and/or flow. For example, in some embodiments, exemplary methods of detecting a leak may also include monitoring the water pressure in the water filter by receiving a plurality of pressure measurements over time and monitoring the flow through the water filter by receiving a plurality of flow measurements over time. In such embodiments, the method may further include calculating a rate of change in the plurality of received pressure measurements over time and calculating a rate of change in the plurality of received flow measurements over time. Thus, the step of detecting the leak may, in some embodiments, be based on an increase in at least one of the rate of change in the plurality of received pressure measurements over time, e.g., the pressure dropping more quickly, and the rate of change in the plurality of received flow measurements over time, e.g., the flow increasing more quickly.

In some embodiments, the leak may be detected based on, e.g., in response to, additional conditions as well as the increase in at least one of the rate of change in the plurality of received pressure measurements over time and the rate of change in the plurality of received flow measurements over time. For example, the leak may be detected when there is no demand for water from the water system, such as only when there is no demand for water and in response to an increase in the rate of change in pressure (e.g., pressure dropping more quickly) and/or flow (e.g., flow accelerating more quickly) without a demand for water. Thus, in some embodiments, an exemplary method of detecting a leak in a refrigerator appliance may also include determining whether there is a system demand for water after the increase in at least one of the rate of change in the received pressure measurements over time and the rate of change in the received flow measurements over time and before detecting the leak.

In some embodiments, the method may further include one or more remedial steps when the leak is detected, e.g., as a result of and in response to the detected leak. For example, the method may include shutting a main valve of the refrigerator appliance after detecting the leak. As another example, the method may also or instead include providing a user notification via a user interface of the refrigerator appliance, e.g., which may be the user interface panel 136 described above or which may be a display component of the user interface panel 136, after detecting the leak.

Figure 6:
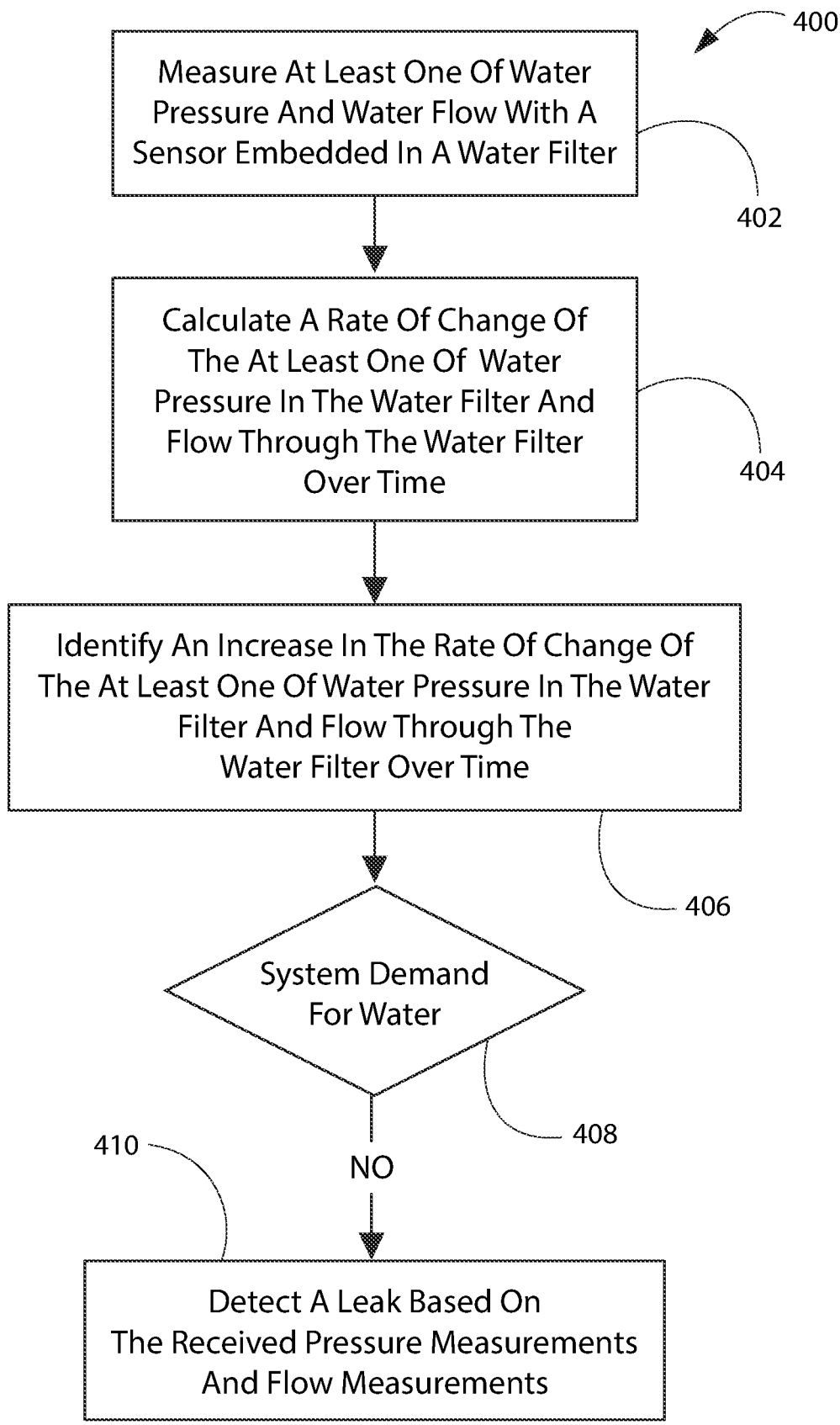
FIG. 6 provides a flow chart of another example method of detecting a leak in a refrigerator appliance according to one or more additional embodiments of the present subject matter.

FIG. 6 illustrates an additional exemplary method 400 of detecting a leak in a refrigerator appliance. The refrigerator appliance may include a water supply line, a water filter coupled to the water supply line, and a sensor embedded in the water filter. As illustrated in FIG. 6, the method 400 may include a step 402 of measuring at least one of water pressure in the water filter and flow through the water filter by the sensor embedded in the water filter. In some embodiments, the step 402 of measuring may include measuring both water pressure in the water filter and flow through the water filter with the sensor embedded in the water filter.

The method 400 may also include a step 404 of calculating a rate of change of the at least one of water pressure in the water filter and flow through the water filter over time. The steps 402 and 404 may be iterative or repeated, e.g., the pressure and/or flow may be continuously or repeatedly measured, and the rate of change may be monitored or tracked, e.g., re-calculated periodically based on new measurements. While monitoring the rate of change, when there is an increase in the rate of change of the at least one of water pressure in the water filter and flow through the water filter over time, the method may include determining whether there is a system demand for water, e.g., as illustrated at step 408 in FIG. 6, in response to the increase in the rate of change of the at least one of water pressure in the water filter and flow through the water filter over time. As mentioned, the increase in the rate of change may include, for example, a drop in pressure that begins to drop more quickly, and/or an acceleration of flow that begins to accelerate more quickly. In some embodiments, e.g., where the step 402 of measuring includes measuring both pressure and flow as mentioned above, the step 404 of calculating may include calculating a rate of change of water pressure in the water filter over time and a rate of change of flow through the water filter over time. In such embodiments, the determining step 408 may be performed in response to either or both of an increase in the rate of change of water pressure in the water filter over time or an increase in the rate of change of flow through the water filter over time.

After determining at step 408 whether there is a system demand for water and when the determination is "NO" as illustrated in FIG. 6, the method 400 may then include a step 410 of detecting a leak based on the increase in the rate of change over time when there is no system demand for water.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of detecting a leak in a refrigerator appliance, the refrigerator appliance comprising a cabinet, a food storage chamber defined in the cabinet, a water supply line, a water filter coupled to the water supply line, and a sensor embedded in the water filter, the method comprising:
   measuring, by the sensor embedded in the water filter, water pressure in the water filter;
   measuring, by the sensor embedded in the water filter, flow through the water filter;
   receiving, by a controller of the refrigerator appliance, the pressure measurement and the flow measurement from the sensor;
   monitoring the water pressure in the water filter by receiving a plurality of pressure measurements over time;
   monitoring the flow through the water filter by receiving a plurality of flow measurements over time;
   calculating a rate of change in the plurality of received pressure measurements over time;
   calculating a rate of change in the plurality of received flow measurements over time; and
   detecting a leak based on the received pressure measurement and flow measurement based on an increase in at least one of the rate of change in the plurality of received pressure measurements over time and the rate of change in the plurality of received flow measurements over time.

2. The method of claim 1, wherein the method does not require the leak contacting the sensor before detecting the leak.

3. The method of claim 1, further comprising determining whether there is a system demand for water after the increase in at least one of the rate of change in the received pressure measurements over time and the rate of change in the received flow measurements over time and before detecting the leak.

4. The method of claim 1, wherein the sensor is embedded in an inlet of the water filter, wherein the step of measuring the water pressure comprises measuring water pressure in the inlet of the water filter and the step of measuring flow through the water filter comprises measuring flow through the inlet of the water filter.

5. The method of claim 1, further comprising shutting a main valve of the refrigerator appliance after detecting the leak.

6. The method of claim 1, further comprising providing a user notification via a user interface of the refrigerator appliance after detecting the leak.

7. A refrigerator appliance, comprising:
a cabinet;
a food storage chamber defined in the cabinet;
a water supply line;
a water filter coupled to the water supply line;
a sensor embedded in the water filter, the sensor configured to measure water pressure in the water filter and flow through the water filter; and
a controller in operative communication with the sensor, the controller configured to:
receive pressure measurements and flow measurements from the sensor;
monitor the received pressure measurements, monitor the received flow measurements;
calculate a rate of change in the received pressure measurements over time;
calculate a rate of change in the received flow measurements over time; and
detect a leak based on the received pressure measurements and flow measurements based on an increase in at least one of the rate of change in the received pressure measurements over time and the rate of change in the received flow measurements over time.

8. The refrigerator appliance of claim 7, wherein the controller is further configured to determine whether there is a system demand for water after the increase in at least one of the rate of change in the received pressure measurements over time and the rate of change in the received flow measurements over time and before detecting the leak.

9. The refrigerator appliance of claim 7, wherein the sensor is embedded in an inlet of the water filter, whereby the sensor is configured to measure water pressure in the inlet of the water filter and flow through the inlet of the water filter.

10. The refrigerator appliance of claim 7, wherein the sensor is wirelessly connected to the controller.

11. The refrigerator appliance of claim 7, wherein the sensor comprises a connecting pin, the connecting pin extending outside of the water filter.

12. The refrigerator appliance of claim 7, wherein the controller is further configured to shut a main valve of the refrigerator appliance after detecting the leak.

13. The refrigerator appliance of claim 7, wherein the controller is further configured to provide a user notification via a user interface of the refrigerator appliance after detecting the leak.

14. The refrigerator appliance of claim 7, wherein the sensor embedded in the water filter is a MEMS sensor.

15. A method of detecting a leak in a refrigerator appliance, the refrigerator appliance comprising a cabinet, a food storage chamber defined in the cabinet, a water supply line, a water filter coupled to the water supply line, and a sensor embedded in the water filter, the method comprising:
measuring, by the sensor embedded in the water filter, at least one of water pressure in the water filter and flow through the water filter;
calculating a rate of change of the at least one of water pressure in the water filter and flow through the water filter over time;
determining whether there is a system demand for water in response to an increase in the rate of change of the at least one of water pressure in the water filter and flow through the water filter over time; and
detecting a leak based on the increase in the rate of change over time when there is no system demand for water.

16. The method of claim 15, wherein the step of measuring comprises measuring, by the sensor embedded in the water filter, water pressure in the water filter and flow through the water filter, wherein the step of calculating comprises calculating a rate of change of water pressure in the water filter over time and a rate of change of flow through the water filter over time, and wherein the step of determining is performed in response to an increase in the rate of change of water pressure in the water filter over time or an increase in the rate of change of flow through the water filter over time.

* * * * *